US009058433B2

(12) United States Patent
Xia

(10) Patent No.: US 9,058,433 B2
(45) Date of Patent: Jun. 16, 2015

(54) ADVANCED EXTENSIBLE INTERFACE BUS AND CORRESPONDING DATA TRANSMISSION METHOD

(75) Inventor: Jing Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 13/495,554

(22) Filed: Jun. 13, 2012

(65) Prior Publication Data

US 2012/0303849 A1  Nov. 29, 2012

Related U.S. Application Data

(63) Continuation of application No. PCT/CN2011/074554, filed on May 24, 2011.

(51) Int. Cl.
*G06F 13/14* (2006.01)
*G06F 13/38* (2006.01)

(52) U.S. Cl.
CPC ....................... *G06F 13/38* (2013.01)

(58) Field of Classification Search
USPC .......................... 710/110, 305–306, 315–317
See application file for complete search history.

(56) References Cited

U.S. PATENT DOCUMENTS

| 6,696,917 | B1 * | 2/2004 | Heitner et al. ................ 340/2.22 |
|---|---|---|---|
| 2003/0101280 | A1 | 5/2003 | Chiu |
| 2007/0011366 | A1 * | 1/2007 | Morishita et al. ............... 710/36 |
| 2008/0235415 | A1 * | 9/2008 | Clark et al. ................... 710/105 |
| 2010/0111088 | A1 * | 5/2010 | Olofsson ....................... 370/392 |
| 2010/0158052 | A1 * | 6/2010 | Timmermans et al. ....... 370/503 |
| 2011/0035523 | A1 * | 2/2011 | Feero et al. .................. 710/110 |
| 2011/0225337 | A1 * | 9/2011 | Byrne et al. .................. 710/306 |
| 2011/0296066 | A1 | 12/2011 | Xia |

FOREIGN PATENT DOCUMENTS

| CN | 101276317 A | 10/2008 |
|---|---|---|
| CN | 101324869 A | 12/2008 |
| CN | 201422114 Y | 3/2010 |
| CN | 101853237 A | 10/2010 |

OTHER PUBLICATIONS

Chinese Search Report issued in corresponding Chinese application CN201180000588.5, Sep. 26, 2012, total 2 pages.
(Continued)

*Primary Examiner* — Tim T Vo
*Assistant Examiner* — Kim T. Huynh
(74) *Attorney, Agent, or Firm* — Leydig, Voit & Mayer, Ltd.

(57) ABSTRACT

An advanced extensible interface (AXI) bus is disclosed. 2×2 AXI crossbars are used as basic units; each including two slave interfaces and two master interfaces; an $N^2$ full Mesh fabric is built by using the basic units, so that each slave interface on one basic unit is connected to a master interface on another basic unit to form a first path. A data transmission method includes: receiving, through a master interface of a basic unit, a data packet sent by a master device; sending, through a slave interface of the basic unit, the data packet to a destination slave device by using an AXI bus; receiving, through the slave interface of the basic unit, a response packet returned by the destination slave device, where the basic units are 2×2 AXI crossbars and the AXI bus is based on an $N^2$ full mesh fabric built by using the basic units.

8 Claims, 4 Drawing Sheets

(56) References Cited

OTHER PUBLICATIONS

International search report for International application No. PCT/CN2011/074554, dated Mar. 8, 2012, total 4 pages.

Arm Limited, "AMBA AXI Protocol v1.0," ARM IHI 0022B, Jun. 16, 2003, total 108 pages.

Yoo et al, "Communication Architecture Synthesis of Cascaded Bus Matrix", 1-4244-0630-7/07/$20.00 ©2007 IEEE, pp. 171-177.

* cited by examiner

ADVANCED EXTENSIBLE INTERFACE BUS AND CORRESPONDING DATA TRANSMISSION METHOD

CROSS-REFERENCE TO RELATED APPLICATIONS

This application is a continuation of International Application No. PCT/CN2011/074554, filed on May 24, 2011, which is hereby incorporated by reference in their entireties.

FIELD OF THE INVENTION

The present invention relates to the field of communication technologies, and in particular, to an advanced extensible interface (AXI, Advanced eXtensible Interface) bus and a corresponding data transmission method.

BACKGROUND OF THE INVENTION

An advanced extensible interface (AXI, Advanced eXtensible Interface) is a high performance system bus for interconnecting high-speed deep sub-micron integrated circuits. FIG. 1a illustrates an AXI protocol architecture, in which the AXI transmission is based on five transmission channels. From the perspective of an upper layer protocol, the AXI divides the transmission into five packets (Packet) by directions, namely, address read (AR, Address Read), read data (R, Read), address write (AW, Address Write), write data (W, Write), and write response (B, Back). The AR packet, AW packet, and W packet are sent to the slave device (Slave) by the master device (Master), and the R packet and B packet are returned to the master device by the slave device. A typical read operation of the AXI consists of one AR and several Rs, and a typical write operation of the AXI consists of one AW, several Ws, and one B. One transmission consists of multiple packets marked with the same device identity (ID, IDentity). Each packet is highly independent of each other and has no fixed phase relationship. Therefore, an efficient outstanding transmission is supported, that is, the master device or the slave device may have several active (Active) yet incomplete operations, and control the sequence of these operations according to the ID.

The AXI bus is also built into various complex on-chip bus structures in addition to the point-to-point connection between the master device and the slave device, including such topologies as shared bus (Shared Bus) and full cross-connect bus (Crossbar), to implement on-chip interconnections between multiple master devices and multiple slave devices.

FIG. 1b is a schematic diagram of a crossbar fabric in the prior art. As shown in FIG. 1b, each master device has a connection relationship with all the slave devices. Therefore, so long as multiple crosspoints (Crosspoint) are closed at the same time, data can be transmitted between multiple different master devices and slave devices at the same time, so that all ports can switch data at a line speed. The quantity of AXI bus signal lines is the product of the quantity of signal lines connected to the AXI, the quantity of master interfaces, and the quantity of slave interfaces. When the quantity of ports is increased linearly, the quantity of signal lines is squared. However, the multi-channel characteristics of the AXI bus determine that a large number of signal lines (about 300 pieces) are included in a group of signal lines. Therefore, a 3×3 crossbar fabric includes a total of 2,700 AXI signal lines, while a 4×4 crossbar fabric includes 4,800 AXI signal lines.

In the process of researching and practicing the prior art, the inventor of the present invention discovers that the prior art has the following problem: In a scenario where a lot of master devices and slave devices are available, if the AXI bus is built using the crossbar fabric in the prior art, the number of signal lines is huge. Therefore, the wiring is hard to implement on the chip or even if the wiring can be implemented, the signal lines are very long, which causes a longer latency, greatly reduces the bus frequency, and therefore affects the bus performance. In addition, the AXI bus built using the crossbar fabric is very difficult to access and extend. Furthermore, the routing mechanism adopts a single routing structure, which easily causes routing congestion.

SUMMARY OF THE INVENTION

Embodiments of the present invention provide an AXI bus and a corresponding data transmission method, where the AXI bus features a simpler structure, better scalability, and flexible routing.

An AXI bus based on an $N^2$ full mesh (Mesh) fabric includes:

N×N basic units, where the basic units are 2×2 AXI crossbars (that is, 2×2 Crossbars), each of the basic units includes two slave interfaces and two master interfaces, where each slave interface on one basic unit is connected to a master interface on another basic unit to form a first path, and N is a positive integer.

A data transmission method includes:
receiving, through a master interface of a basic unit, a data packet sent by a master device;
sending, through a slave interface of the basic unit, the data packet to a destination slave device by using an AXI bus; and
receiving, through the slave interface of the basic unit, a response packet returned by the destination slave device;
where, the basic units are 2×2 AXI crossbars and the AXI bus is based on an $N^2$ full Mesh fabric built by using the basic units, where N is a positive integer and the number of the basic units is equal to N×N.

In embodiments of the present invention, 2×2 AXI crossbars are used as the basic units, and the basic units are used to build an $N^2$ full Mesh fabric. Compared with the crossbar fabric in the prior art, the $N^2$ full Mesh fabric has advantages such as fewer lines, low complexity, and better scalability. In addition, because the basic units in the $N^2$ full Mesh fabric are 2×2 AXI crossbars, the routing mechanism is more flexible and simpler. Furthermore, a multi-port structure can help to set multiple routes and prevent AXI bus congestion due to path congestion, and the multiple routes can be used to share the bandwidth in the case of heavy data traffic.

BRIEF DESCRIPTION OF THE DRAWINGS

To make the technical solutions in embodiments of the present invention clearer, the accompanying drawings used in the description of the embodiments of the present invention are briefly described hereunder. Evidently, the accompanying drawings illustrate only some exemplary embodiments of the present invention, and those skilled in the art can derive other drawings from such accompanying drawings without creative efforts.

DETAILED DESCRIPTION OF THE EMBODIMENTS

The technical solutions provided in embodiments of the present invention are hereinafter described clearly and completely with reference to the accompanying drawings. Apparently, the embodiments described below are exemplary only, without covering all embodiments of the present invention. All other embodiments that those skilled in the art obtain based on embodiments of the present invention also fall within the protection scope of the present invention.

An embodiment of the present invention provides an AXI bus and a corresponding data transmission method, as detailed below.

An AXI bus based on an $N^2$ full Mesh fabric includes N×N basic units, where the basic units are bus fabrics of 2×2 AXI crossbars (that is, 2×2 Crossbars), each of the basic units includes two slave interfaces and two master interfaces, and each slave interface on one basic unit is connected to a master interface on another basic unit to form a first path. Wherein, N is a positive integer. To prevent a too long latency due to a too large network, N is generally a positive integer smaller than 8. Details are provided with reference to some examples.

Figure 1A:
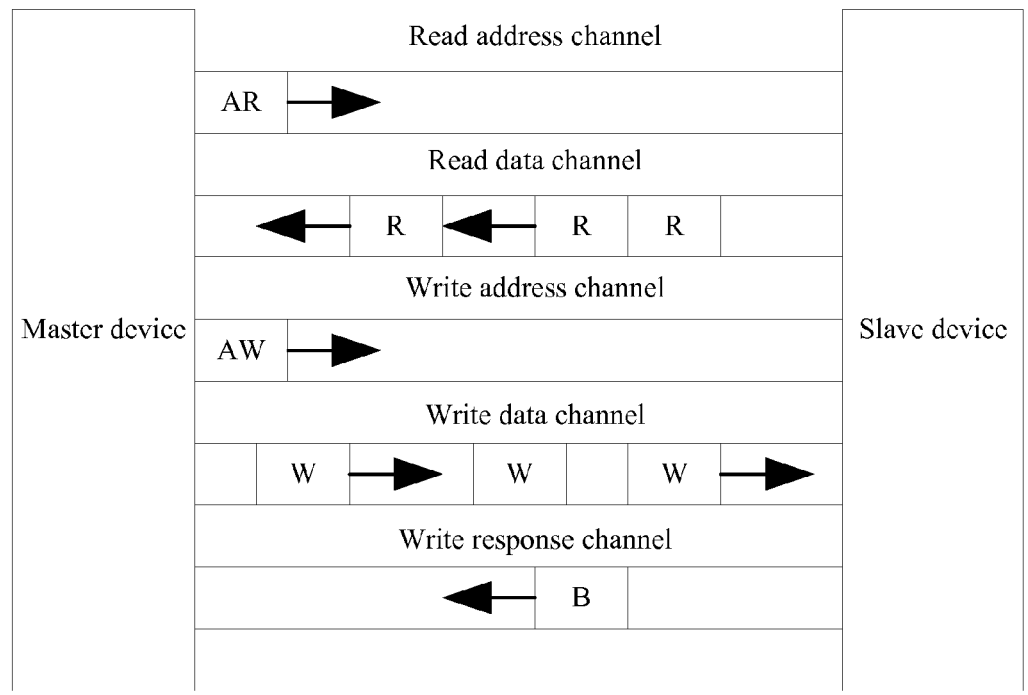
FIG. 1a is a schematic diagram of an AXI protocol architecture.
Figure 1B:
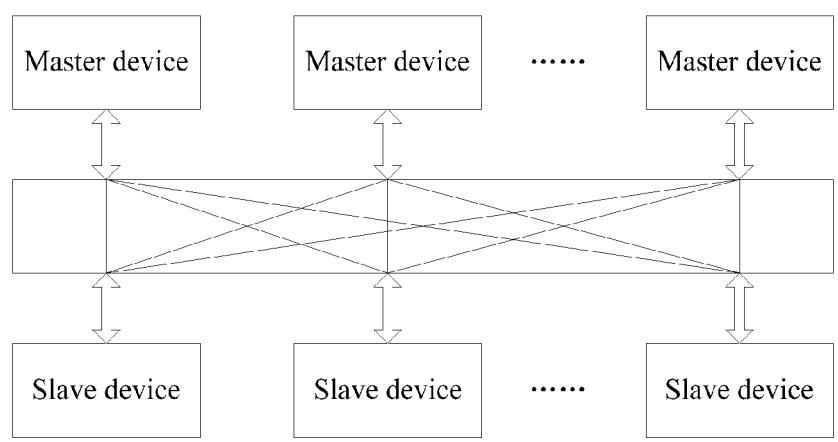
FIG. 1b is a schematic diagram of a crossbar fabric in the prior art.
Figure 2:
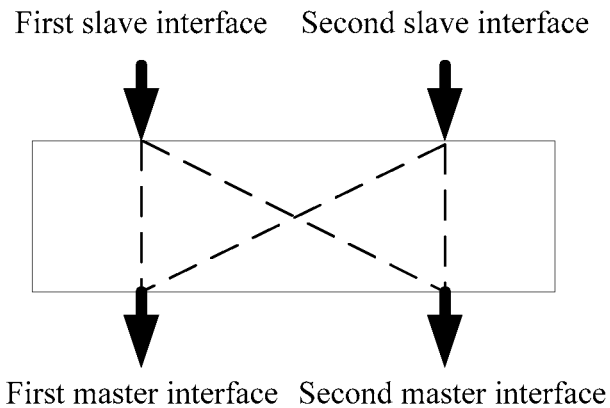
FIG. 2 is a schematic diagram of a basic unit in an AXI bus according to an embodiment of the present invention.

FIG. 2 is a schematic diagram of a basic unit. As shown in FIG. 2, the basic unit has two slave interfaces and two master interfaces, concretely, a first slave interface, a second slave interface, a first master interface, and a second master interface. The first slave interface is connected to the first master interface and the second master interface, and the second slave interface is also connected to the first master interface and the second master interface, as shown by dashed lines in FIG. 2.

It should be noted that the first slave interface has the same structure and functions as the second slave interface and that the first master interface has the same structure and functions as the second master interface. Wherein, in this embodiment of the present invention, the first slave interface and the second slave interface are collectively called a slave interface, and the first master interface and the second master interface are collectively called a master interface.

An $N^2$ full mesh (Mesh) fabric is built by using the basic units, so that each slave interface on one basic unit is connected to a master interface on another basic unit. For ease of description, the path formed between two basic units is called a first path. That is, the first path refers to a path between the slave interface of one basic unit and the master interface of another basic unit.

Figure 3:
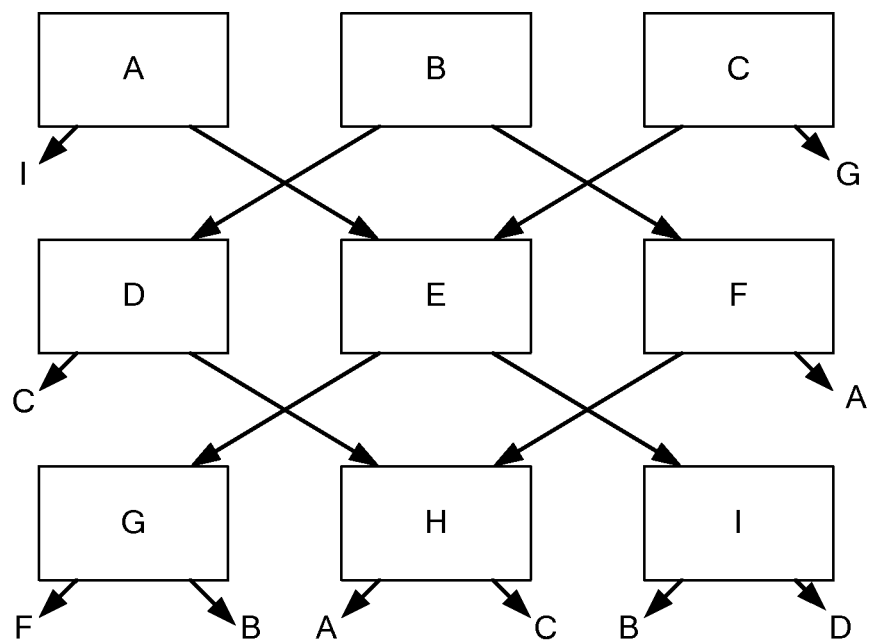
FIG. 3 is a structural diagram of an AXI bus where N is equal to 3 according to an embodiment of the present invention.

For example, FIG. 3 is a structural diagram of an AXI bus where N is equal to 3. In FIG. 3, the AXI bus includes $3^2$ (that is, 9) basic units, namely, basic unit A, basic unit B, basic unit C, basic unit D, basic unit E, basic unit F, basic unit G, basic unit H, and basic unit I. The connection relationships between the units may be as follows:

The first master interface of the basic unit A is connected to the second slave interface of the basic unit I, and the second master interface of the basic unit A is connected to the first slave interface of the basic unit E.

The first master interface of the basic unit B is connected to the second slave interface of the basic unit D, and the second master interface of the basic unit B is connected to the first slave interface of the basic unit F.

The first master interface of the basic unit C is connected to the second slave interface of the basic unit E, and the second master interface of the basic unit C is connected to the first slave interface of the basic unit G.

The first master interface of the basic unit D is connected to the second slave interface of the basic unit C, and the second master interface of the basic unit D is connected to the first slave interface of the basic unit H.

The first master interface of the basic unit E is connected to the second slave interface of the basic unit G, and the second master interface of the basic unit E is connected to the first slave interface of the basic unit I.

The first master interface of the basic unit F is connected to the second slave interface of the basic unit H, and the second master interface of the basic unit F is connected to the first slave interface of the basic unit A.

The first master interface of the basic unit G is connected to the second slave interface of the basic unit F, and the second master interface of the basic unit G is connected to the first slave interface of the basic unit B.

The first master interface of the basic unit H is connected to the second slave interface of the basic unit A, and the second master interface of the basic unit H is connected to the first slave interface of the basic unit C.

The first master interface of the basic unit I is connected to the second slave interface of the basic unit B, and the second master interface of the basic unit I is connected to the first slave interface of the basic unit D.

The path formed between two basic units is called the first path, for example, the connection between each unit shown in FIG. 3.

The first path includes a register slice (Register Slice) used to connect the master device or the slave device, that is, the master device or the slave device may access the AXI bus through the register slice.

The number of the register slices may be set according to actual application requirements. For example, the number of the register slices may be set to be equal to the number of nodes on the first path (For ease of description, this embodiment of the present invention assumes that the number of register slices is equal to the number of nodes on the first path. It is understandable that the number of the register slices is not limited in this embodiment), where the node refers to a master device or a slave device. That is, multiple master devices or slave devices can be inserted on the first path, while the master devices and the slave devices may have multiple nodes. Generally, one stage of a register slice is configured to connect one master device or one slave device. Therefore, each time when one master device or slave device is inserted, one register slice needs to be added.

Figure 4:
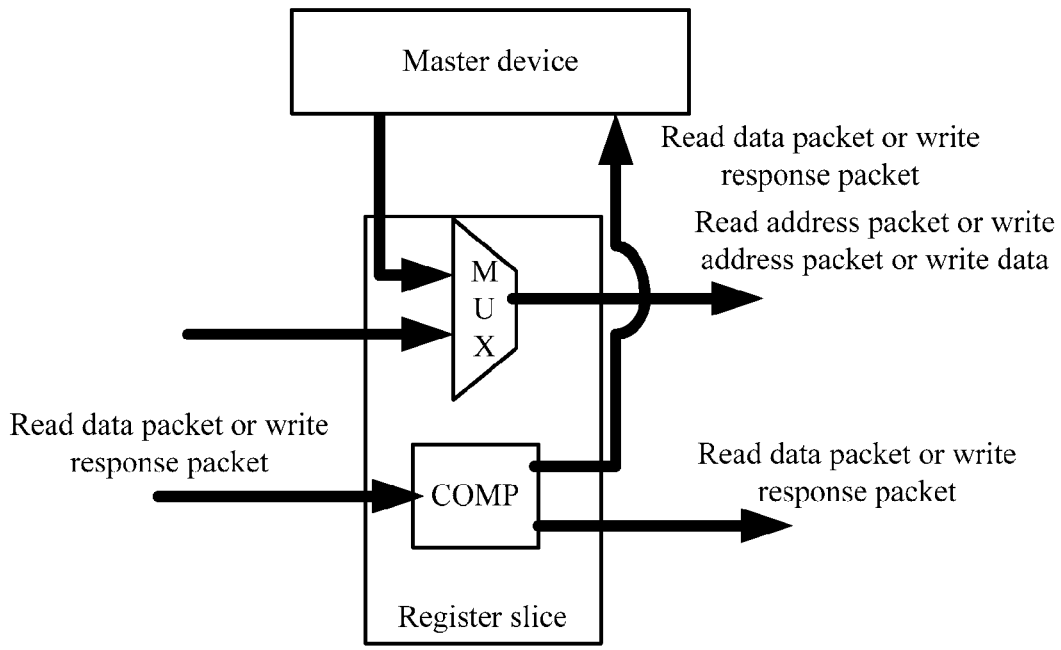
FIG. 4 is a schematic diagram when a register slice is connected to a master device.
Figure 5:
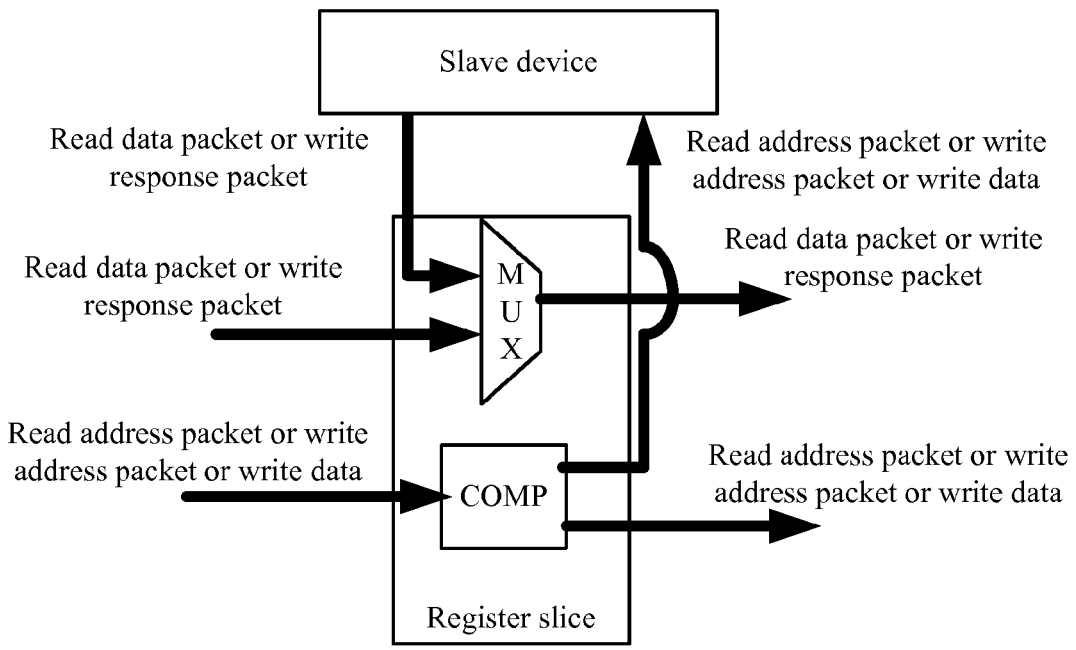
FIG. 5 is a schematic diagram when a register slice is connected to a slave device.

The structure of the register slice is shown in FIG. 4 and FIG. 5. The register slice may include a multiplex (MUX, Multiplex) module and a compound signal (COMP) module.

As shown in FIG. 4, when the register slice is configured to connect a master device, the MUX module of the register slice may be configured to receive an address read packet, an address write packet, or a write data packet inserted by the connected master device, and in such case, the COMP module is configured to capture the device ID of the master device, and also configured to capture a read data packet or a write response packet that matches the device ID.

As shown in FIG. 5, when the register slice is configured to connect a slave device, the MUX module of the register slice is configured to receive a read data packet or a write response packet inserted by the connected slave device, and in such case, the COMP module is configured to capture an address read packet, an address write packet, and a write data packet whose address matches a preset address.

To prevent the cases such as the outstanding of the address write packet and write data packet or the difficulty in inserting data into nodes due to transmission separation, each basic unit has the function of aligning the address write packet received by the master interface of the basic unit with the write data packet. The aligning means that the address write packet and the write data packet meet a certain correspondence. If the address write packet is not aligned with the write data packet and the address write packet and the write data packet are transmitted separately, a bus deadlock may occur due to the crossing of data. That is, the basic unit is further configured to align the address write packet with a corresponding write data packet to ensure that the address write packet and the write data packet transmitted by the master interface of the basic unit do not have an outstanding (Outstanding) function. When each basic unit receives the address write packet from a node under its master interface, subsequent new Write data is the write data packet corresponding to the address write packet.

It should be noted that to align the address write packet received by the master interface of the basic unit with the write data packet is to determine its corresponding write data packet for the address write packet.

As can be known above, in this embodiment, 2×2 AXI crossbars are used as the basic units, and the basic units are used to build an $N^2$ full Mesh fabric. Compared with the crossbar fabric in the prior art, the $N^2$ full Mesh fabric has advantages such as fewer lines, low complexity, and better scalability. In addition, because the basic units in the $N^2$ full Mesh fabric are 2×2 AXI crossbars, each basic unit can provide two slave interfaces and two master interfaces, and multiple routes may be set. Therefore, the routing mechanism is more flexible, AXI bus congestion due to path congestion may be prevented, and the multiple routes may be used to share the bandwidth in the case of heavy data traffic.

Accordingly, an embodiment of the present invention also provides a data transmission method, as detailed below.

In this embodiment, the method is described from the perspective of a basic unit.

A data transmission method includes: receiving, through a master interface of a basic unit, a data packet sent by a master device; sending, through a slave interface of the basic unit, the data packet to a destination slave device by using an AXI bus; and receiving, through the slave interface of the basic unit, a response packet returned by the destination slave device.

Basic units are 2×2 AXI crossbars and the AXI bus is based on an $N^2$ full Mesh fabric built by using the basic units, where N is a positive integer and the number of the basic units is equal to N×N. For details, refer to the foregoing embodiment.

Figure 6:
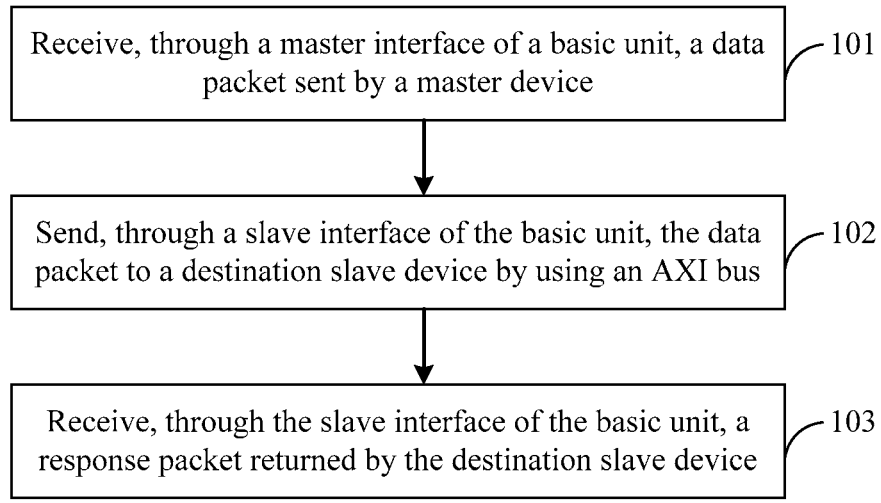
FIG. 6 is a flowchart of a data transmission method according to an embodiment of the present invention.

The following describes the data transmission method by using some examples. As shown in FIG. 6, the data transmission method may include the following steps:

Step 101: Receive, through a master interface of a basic unit, a data packet sent by a master device, where the data packet may be an address read packet, an address write packet, or a write data packet.

Step 102: Send, through a slave interface of the basic unit, the data packet to a destination slave device by using an AXI bus.

For example, the address read packet, address write packet, or write data packet is sent through the slave interface of the basic unit to the destination slave device by using the AXI bus.

To improve the security of the AXI and the flexibility of routing, multiple routes (at least two routes) may be available between the master device and the destination slave device. In this way, the multiple routes can be used to share the bandwidth when necessary. In addition, when a failure or congestion occurs on a current route, another route may be used to transmit data, which prevents the congestion of the AXI bus due to the route congestion.

Because at least two routes are available between the master device and the destination slave device, the basic unit needs to select a route before the data packet is transmitted. Specifically, step 102, namely, the step of transmitting, through the slave interface of the basic unit, the data packet to the destination device by using the AXI bus may be as follows:

selecting a route according to the ID of the AXI bus, and sending, through the slave interface of the basic unit, the data packet to the destination slave device by using the selected route.

In addition, when a failure or congestion occurs on the current route, the basic unit may also select another route to transmit the current data packet. That is, the data transmission method may further include:

when a failure or congestion occurs on the selected route, determining whether the duration of the failure or congestion exceeds a preset duration; if so, reselecting a route according to the ID of the AXI bus; otherwise, continuing to transmit the data packet by using the current route after the route recovers to normal.

The ID of the AXI bus is used to indicate a route. In a sent request, each node uses the highest bit of the ID of the AXI bus as the route information. After the request is routed, the ID is rotated left, and the highest bit is shifted to the lowest bit. When a response is returned, the lowest bit is shifted to the highest bit. The ID includes two parts: a code number of the master device and route information. The route information is filled by the master device according to the route information recorded in the sending process. The ID of the AXI bus may include a master device ID and a route ID of $N^2$ bit width. For example, in the $3^2$ full Mesh fabric, if the master device ID is 6 bits (bits), the route ID is $3^2$, that is, 9 bits, and in this case, a bus ID of 15 bits is transmitted each time.

The step of selecting a route according to the ID of the AXI bus may be: decoding the route ID to determine a next hop node. For example, each bit in the route ID may be used as the decoding address of the basic unit (that is, the 2×2 crossbar), where 1 indicates the right interface of the basic unit (that is, the master interface on the right side or the slave interface on the right side), and 0 indicates the left interface of the basic unit (the master interface on the left side or the slave interface on the left side), or on the contrary, 0 indicates the right interface of the basic unit, and 1 indicates the left interface of the basic unit; after the interface of the basic unit is determined, the basic unit of the next hop node can be determined, and the specific interface in the basic unit of the next hop node is determined. In the practical implementation, the decoding may be performed from the highest bit to the lowest bit or from the lowest bit to the highest bit. Details are as follows:

(1) The step of decoding the route ID to determine a next hop node may include:

when receiving an address read packet, an address write packet, or a write data packet, decoding the highest bit of the route ID to determine a next hop node, and left rotating the route ID after the route ID is decoded; and when receiving a read data packet or a write response packet, decoding the lowest bit of the route ID to determine a next hop node, and right rotating the route ID after the route ID is decoded.

Or, (2) The step of decoding the route ID to determine a next hop node may include:

when receiving an address read packet, an address write packet, or a write data packet, decoding the lowest bit of the route ID to determine a next hop node, and right rotating the route ID after the route ID is decoded; and when receiving a read data packet or a write response packet, decoding the highest bit of the route ID to determine a next hop node, and left rotating the route ID after the route ID is decoded.

The route ID needs to be a full route, that is, the $N^2$ bits in the route ID need to be fully occupied. For example, if N is equal to 3, all the 9 bits in the route ID must be valid, and the route must return to the start point after nine times of decoding. That is, if no slave device receives the data packet, the data packet needs to be sent back to the master device sending the data packet. In addition, if the slave device rejects the master device, the slave device needs to always reject the route ID of the master device until the route is switched, to prevent the occurrence of order (Order) errors. After the data packet is returned to the master device, the master device may switch the route to re-attempt.

Step 103: Receive, through the slave interface of the basic unit, a response packet returned by the destination slave device, where the response packet may be a read data packet or a write response packet. Details are as follows:

If the data packet is an address read packet, step 103, namely, the step of receiving, through the slave interface of the basic unit, a response packet returned by the destination slave device may be:

receiving, through the slave interface of the basic unit, a read data packet returned by the destination slave device.

If the data packet is an address write packet or a write data packet, step 103, namely, the step of receiving, through the slave interface of the basic unit, a response packet returned by the destination slave device may be:

receiving, through the slave interface of the basic unit, a write response packet returned by the destination slave device.

Optionally, the line status of the AXI bus may be detected through an all-ones traverse request and an all-zeros traverse request to detect whether a device is online. That is, the data transmission method may further include:

traversing the AXI bus by using an all-ones traverse request and an all-zeros traverse request, where the route ID in the all-ones traverse request is set to all 1 and the route ID in the all-zeros traverse request is set to all 0. For example, in the $N^2$ AXI bus, the route ID in the all-ones traverse request is "111111111", which passes through E→I→D→H→C→G→B→F→A→E in sequence; the route ID in the all-zeros traverse request is "000000000", which passes through E→G→F→H→A→I→B→D→C→E in sequence.

In addition, to prevent the outstanding of the address write packet and write data packet in the AXI bus or difficulty in inserting nodes due to transmission separation, each basic unit can align the address write packet received by the master interface of the basic unit with the write data packet. That is, the data transmission method may further include: aligning the address write packet with a corresponding write data packet to ensure that the address write packet and the write data packet transmitted by the master interface of the basic unit do not have an outstanding (Outstanding) function. When each basic unit receives the address write packet from a node under its master interface, subsequent new Write data packet is the write data packet corresponding to the address write packet.

As can be known above, this embodiment provides a data transmission method based on the AXI bus provided in the embodiment of the present invention. In this method, 2×2 AXI crossbars are used as the basic units of the AXI bus, and the basic units are used to build an $N^2$ full Mesh fabric. Compared with the crossbar fabric in the prior art, the $N^2$ full Mesh fabric has advantages such as fewer lines, low complexity, and better scalability. In addition, the data transmission method provided in this embodiment provides a flexible routing mechanism; compared with the single routing mechanism in the prior art, this routing mechanism enhances the security of the AXI bus and implements bandwidth sharing. Furthermore, by using the data transmission method provided in this embodiment, whether a device is online may be detected through a traverse request.

The method provided in the foregoing embodiment is further described by using some examples.

In this embodiment, the AXI bus is an AXI bus with N being 3, 1 in the route ID indicates the right interface of a basic unit (that is, the master interface on the right side or the slave interface on the right side), and 0 in the route ID indicates the left interface of the basic unit (that is, the master interface on the left side or the slave interface on the left side).

Figure 7:
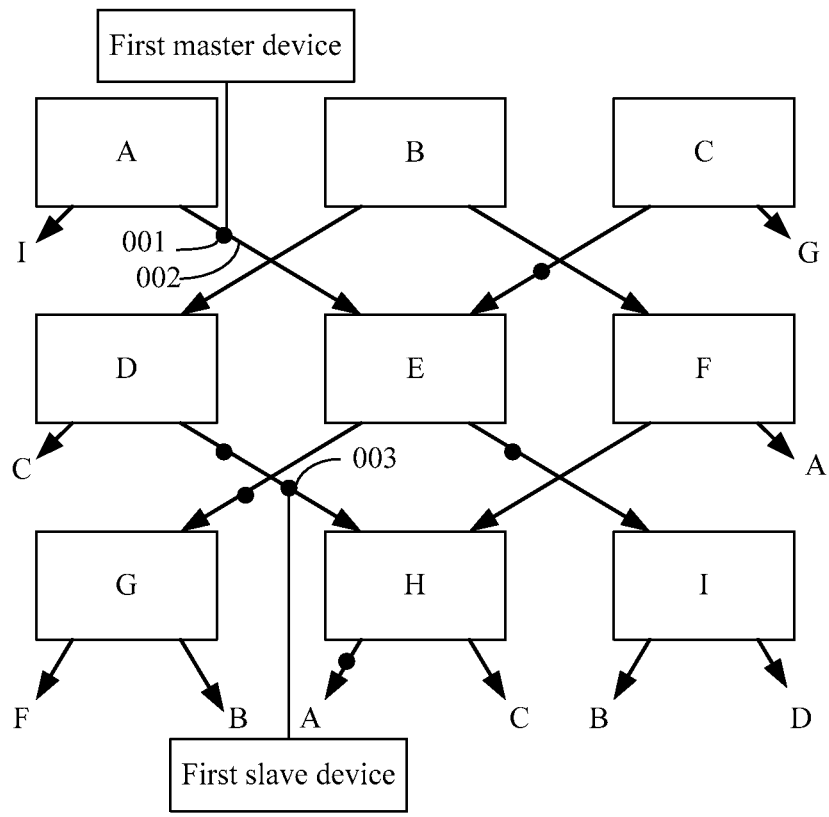
FIG. 7 is a structural diagram of an AXI bus in a scenario where N is equal to 3 according to an embodiment of the present invention.

As shown in FIG. 7, the paths between the basic units are first paths; small bullet points in each first path indicate register slices, and a master device or a slave device accesses the AXI bus through a register slice. For example, as shown in FIG. 7, a path 002 between the basic unit A and the basic unit E is a first path, and small bullet points 001 and 003 are register slices. The first master device accesses the AXI bus through the register slice 001, and the first slave device accesses the AXI bus through the register slice 003 on the first path between the basic unit D and the basic unit H.

In the following description, it is assumed that the first master device reads data from the first slave device. The specific process may include the following steps:

Step 1: The first master device sends an address read packet for reading data from the first slave device, where the address read packet carries the ID of the AXI bus, where the ID of the AXI bus includes an inherent ID of the first master device (that is, the master device ID) and a route ID.

The route ID may be obtained by the first master device by querying a routing table according to the matching address of the first slave device, where the routing table may be stored in the first master device.

It should be noted that the master device may have multiple master device IDs and the slave device may have multiple matching addresses. In this way, a proper master device ID and a matching address of the slave device may be selected according to a preset policy.

Because the first slave device locates on the path between the master interface of the basic unit D and the slave interface of the basic unit H, the route of the address read packet must pass through the basic unit H. For ease of description, in this embodiment, it is assumed that two routes are available between the first master device and the first slave device. The active route is A→E→G→B→D→H→C→G→F→A, and the route ID is "101011101". The standby route is A→E→I→D→H→C→G→B→F→A, and the route ID is "111111111".

Step 2: After the master interface of the basic unit A receives the address read packet, a next hop node is determined according to the route ID, for example, if the route ID is "101011101", the basic unit A decodes the highest bit of the route ID. Because the highest bit is 1 and indicates the master interface on the right side, the basic unit A determines that the next hop node is the basic unit E. The basic unit A left rotates the route ID, that is, it changes the route ID to "010111011", and then sends the address read packet to the basic unit E.

Step 3: After the basic unit E receives the address read packet, it also determines a next hop node according to the route ID "010111011". Because the highest bit of the route ID is "0", the basic unit E determines that the next hop node is the basic unit G. The basic unit E left rotates the route ID, that is, it changes the route ID to "101110110", and then sends the address read packet to the basic unit G.

Step 4: After the basic unit G receives the address read packet, it also determines a next hop node according to the route ID "101110110". Because the highest bit of the route ID is "1", the basic unit G determines that the next hop node is the basic unit B. The basic unit G left rotates the route ID, that is, it changes the route ID to "011101101", and then sends the address read packet to the basic unit B.

Step 5: After the basic unit B receives the address read packet, it determines a next hop node according to the route ID "011101101". Because the highest bit of the route ID is "0", the basic unit B determines that the next hop node is the basic unit D. The basic unit B left rotates the route ID, that is, it changes the route ID to "111011010", and then sends the address read packet to the basic unit D.

Step 6: After the basic unit D receives the address read packet, it determines a next hop node according to the route ID "111011010". Because the highest bit of the route ID is "1", the basic unit D determines that the next hop node is the basic unit H. The basic unit D left rotates the route ID, that is, it changes the route ID to "110110101", and then sends the address read packet to the basic unit H.

Step 7: After the basic unit H receives the address read packet, it sends the address read packet to the first slave device according to the address of the first slave device in the address read packet. Then, the basic unit H left rotates the route ID, that is, it changes the route ID to "101101011".

Step 8: After the first slave device receives the address read packet, it returns a corresponding read data packet to the basic unit H.

Step 9: The basic unit H determines a next hop node according to the route ID "101101011". Because the read data packet is transmitted currently, the basic unit H may determine the next hop node according to the lowest bit in the route ID "101101011". Because the lowest bit of the route ID is "1", the basic unit H determines that the next hop node is the basic unit C. Then, the basic unit H right rotates the route ID, that is, it changes the route ID to "110110101", and sends the read data packet to the basic unit C, where the read data packet carries the master device ID of the first master device and the route ID "110110101".

Step 10: After the basic unit C receives the read data packet, it determines a next hop node according to the route ID "110110101". Because the lowest bit of the route ID is "1", the basic unit C determines that the next hop node is the basic unit G. Then, the basic unit C right rotates the route ID, that is, it changes the route ID to "111011010", and sends the read data packet to the basic unit G Step 11: After the basic unit G receives the read data packet, it determines a next hop node according to the route ID "111011010". Because the lowest bit of the route ID is "0", the basic unit G determines that the next hop node is the basic unit F. Then, the basic unit G right rotates the route ID, that is, it changes the route ID to "011101101", and sends the read data packet to the basic unit F.

Step 12: After the basic unit F receives the read data packet, it determines a next hop node according to the route ID "011101101". Because the lowest bit of the route ID is "1", the basic unit F determines that the next hop node is the basic unit A. Then, the basic unit F right rotates the route ID, that is, it changes the route ID to "101110110", and sends the read data packet to the basic unit A.

Step 12: After the basic unit A receives the read data packet, it sends the read data packet to the first master device according to the master device ID in the read data packet.

Step 13: The first master device receives the read data packet.

The process that the first master device writes data to the first slave device is similar to the above process that the first master device reads data from the first slave device, and is not described.

In the above description, it is assumed that the highest bit in the route ID is used as the ID of the foregoing slave device (that is, in the direction of the address read packet, address write packet or write data) and that the highest bit in the route ID is used as the returned ID of the master device (that is, in the direction of the read data packet and write response packet). It is understandable that the lowest bit in the route ID may also be set to the ID of the slave device and that the lowest bit in the route ID may be used as the returned ID of the master device. The implementation method is similar, and is not described.

In addition, for sequential operations (the sequence of operations needs to be maintained), a same master device ID and route ID must be used. In addition, multiple slave devices should not be accessed by using a same master device ID, in order to prevent performance degrade due to the sequential operations. Optionally, the slave device may involve a re-order buffer for an order model so that sequential operations can be buffered. That is, after receiving the address read packet, address write packet, or write data packet, the slave device does not return a response immediately but buffers the address read packet, address write packet, or write data packet firstly and returns a response after a preset duration.

By using the method provided in this embodiment of the present invention, the following detection may also be implemented:

(1) The master device may know whether the slave device is online: If a normal access request is not received by the slave device but is returned to the master device sending the access request, it indicates that the slave device is offline or does not exist.

(2) The master device updates and optimizes the route: If a normal access request is not received by the slave device, the slave device may carry hop count information in the returned information; after receiving the returned information, the master device updates the route according to the carried hop count information to search for a better standby path.

(3) Cache coherent (Cache Coherent) query can be implemented through a traverse request to query whether a node cache (Cache) data copy exists; if not, a normal request is sent to the memory to obtain a node cache data copy.

(4) The traverse procedure can be used to broadcast information. When the information arrives at the sending node, it indicates that the broadcast is complete.

As can be known above, this embodiment provides a data transmission method based on the AXI bus provided in the embodiment of the present invention. In this method, 2×2 AXI crossbars are used as the basic units of the AXI bus, and the basic units are used to build an $N^2$ full Mesh fabric.

Compared with the crossbar fabric in the prior art, the $N^2$ full Mesh fabric has advantages such as fewer lines, low complexity, and better scalability. In addition, the data transmission method provided in this embodiment provides a flexible routing mechanism; compared with the single routing mechanism in the prior art, this routing mechanism enhances the security of the AXI bus and implements bandwidth sharing. Furthermore, by using the data transmission method provided in this embodiment, whether a device is online can be detected through a traverse request, and cache coherent detection and high-speed information broadcasting can be implemented.

In conclusion, compared with the AXI bus in the prior art, the AXI bus and corresponding data transmission method provided in embodiments of the present invention have better performance.

It is understandable by persons of ordinary skill in the art that all or part of steps of the methods in the above embodiments may be completed by related hardware instructed by a program. The program may be stored in a computer readable storage medium. The storage medium may include a read only memory (ROM, Read Only Memory), a random access memory (RAM, Random Access Memory), a magnetic disk, or a CD-ROM.

Detailed above are an AXI bus and corresponding data transmission method provided in embodiments of the present invention. Although the principle and implementation of the present invention are described with reference to exemplary embodiments, the embodiments are only intended to help understand the method and core idea of the present invention. In addition, with respect to the implementation and applicability of the present invention, modifications and variations may be made by those skilled in the art according to the idea of the present invention. Therefore, the specification shall not be construed as a limitation on the present invention.

What is claimed is:

1. An advanced extensible interface (AXI) bus, wherein:
the AXI bus is based on an $N^2$ full Mesh fabric and comprises N×N basic units, the N×N basic units are configured in N stages, wherein each stage has N basic units, wherein the basic units are 2×2 AXI crossbars, each of the basic units comprises two slave interfaces and two master interfaces, each slave interface on one basic unit is connected to a master interface on another basic unit in another stage to receive a packet therefrom, two slave interfaces of one basic unit are respectfully connected to master interfaces of two different basic units in other stages, two master interfaces of one basic unit are respectively connected to slave interfaces of another two different basic units in other stages, and N is a positive integer which is equal to or more than 3, and for each basic unit, when a packet is received, the following steps are performed:
obtaining a route ID from the packet, decoding a highest bit of the route ID to determine a master interface which communicates with a basic unit of a next hop, and left rotating the route ID, and sending the packet to the basic unit of the next hop with the rotated route ID; or
obtaining a route ID from the packet, decoding lowest bit of the route ID to determine a master interface which communicates with a basic unit of a next hop, and right rotating the route ID, and sending the packet to the basic unit of the next hop with the rotated route ID.

2. The AXI bus according to claim 1, wherein the first path comprises a register slice configured to connect a master device or a slave device.

3. The AXI bus according to claim 2, wherein:
the register slice comprises a multiplex (MUX) module and a compound signal (COMP) module;
if the register slice is configured to connect a master device, the MUX module is configured to receive one of an address read packet, an address write packet, and a write data packet inserted by the master device;
the COMP module is configured to capture a device identity (ID) of the master device and one of a read data packet and a write response packet that matches the device ID;
if the register slice is configured to connect a slave device, the MUX module is configured to receive one of a read data packet and a write response packet inserted by the slave device; and
the COMP module is configured to capture one of an address read packet, an address write packet, and a write data packet whose address matches a preset address.

4. The AXI bus according to claim 3, wherein:
the slave interface on the one basic unit is further configured to align an address write packet received by the master interface of the another basic unit with a write data packet corresponding to the address write packet.

5. A router system, comprising:
N×N crossbar units, wherein, the N×N basic units are configured in N stages, wherein each stage has N basic units, and each of the crossbar units comprises two master interfaces and two slave interfaces;
each of the crossbar units is configured to receive packets from two other crossbar units in other stages through the two slave interfaces, and each of the crossbar units is configured to transfer the packets to another two crossbar units in other stages through the two master interfaces according to router identification of the packets, the crossbar units construct a communication network in which packets could be transferred among the crossbar units in a circular way through the two master interfaces and the two slave interfaces of each of the crossbar units, N is a positive integer which is equal to or more than 3, wherein for each basic unit, when a packet is received, the following steps are performed:
obtaining a route ID from the packet, decoding a highest bit of the route ID to determine a master interface which communicates with a basic unit of a next hop, and left rotating the route ID, and sending the packet to the basic unit of the next hop with the rotated route ID; or
obtaining a route ID from the packet, decoding a highest bit of the route ID to determine a master interface which communicates with a basic unit of a next hop, and right rotating the route ID, and sending the packet to the basic unit of the next hop with the rotated route ID.

6. The router system according to claim 5, wherein, the packets comprise an address read packet, a read data packet, an address write packet, a write data packet or a write response packet.

7. The router system according to claim 5, wherein, the router identification is composed of a series of bits, wherein the series of bits are configured to indicate paths of each of the packets in different crossbars units.

8. The router system according to claim 5, wherein, each of the router units further comprises a path determining module, configured to obtain the router identification from a routing table according to a destination of the packet.

* * * * *